United States Patent [19]
Kadohara et al.

[11] Patent Number: 5,669,022
[45] Date of Patent: Sep. 16, 1997

[54] OPTICAL APPARATUS INCLUDING A LIGHT MODULATION FINDER OPTICAL SYSTEM

[75] Inventors: Terutake Kadohara; Yoshihiko Aihara, both of Yokohama, Japan

[73] Assignee: Canon Kabushiki Kaisha, Tokyo, Japan

[21] Appl. No.: 453,817

[22] Filed: May 30, 1995

[30] Foreign Application Priority Data

May 31, 1994 [JP] Japan .................................. 6-139625

[51] Int. Cl.⁶ .................................................. G03B 19/12
[52] U.S. Cl. ........................... 396/111; 396/268; 396/271
[58] Field of Search .................................. 354/152, 400, 354/410; 396/51, 84, 111, 141, 148, 152, 268, 269, 271, 276

[56] References Cited

U.S. PATENT DOCUMENTS

| | | | |
|---|---|---|---|
| 4,788,569 | 11/1988 | Yamada et al. | 354/409 |
| 5,126,777 | 6/1992 | Akashi et al. | 354/402 |

FOREIGN PATENT DOCUMENTS

| | | | |
|---|---|---|---|
| 58-31132 | 7/1983 | Japan . | |
| 60-177775 | 9/1985 | Japan | 354/152 |
| 64-042639 | 2/1989 | Japan . | |
| 2-064517 | 3/1990 | Japan . | |
| 4-308825 | 10/1992 | Japan | 354/152 |

*Primary Examiner*—D. Rutledge
*Attorney, Agent, or Firm*—Fitzpatrick, Cella, Harper & Scinto

[57] ABSTRACT

An optical apparatus includes a projection optical system for projecting an object image; a focal detection system for detecting a defocus state of the object image with respect to a photosensitive plane by a light emitted from the projection optical system; a finder system for observing the object by the light emitted from the projection optical system, the finder system being provided with a light modulation unit for creating a light transmission state when electric energy is input and a cutoff state when electric energy is not input, and the light modulation unit being disposed so as to cover the view field of the finder system; and a control unit for controlling input of the electric energy to a light modulation unit, the control unit controlling so as not to input electric energy when the user does not look through the finder system.

18 Claims, 13 Drawing Sheets

| FIG. 3A | FIG. 3B |

PRINCIPLE OF TN-TYPE ELECTRO-OPTICAL EFFECT
FIG. 4(a) WITHOUT APPLICATION OF VOLTAGE
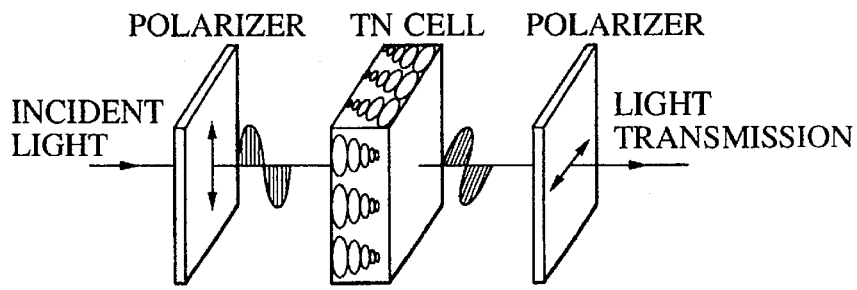
FIG. 4(b) APPLICATION OF VOLTAGE
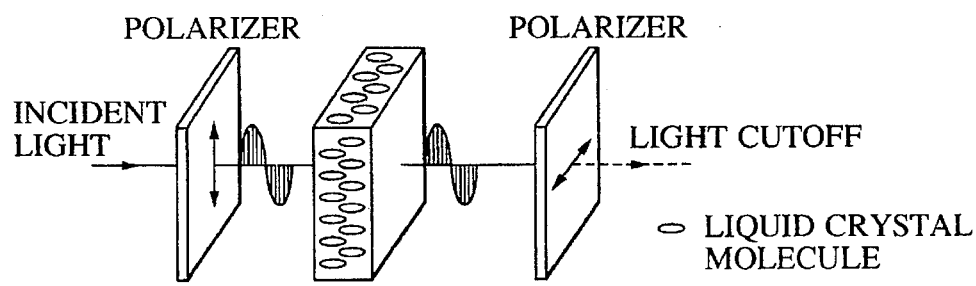
○ LIQUID CRYSTAL MOLECULE
PRINCIPLE OF GH-TYPE ELECTRO-OPTICAL EFFECT
FIG. 5(a) WITHOUT APPLICATION OF VOLTAGE
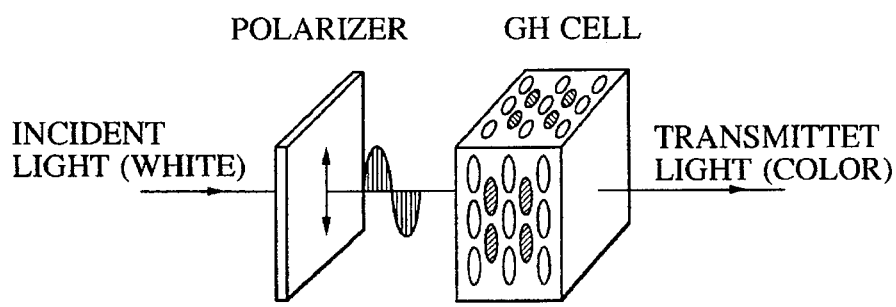
FIG. 5(b) APPLICATION OF VOLTAGE
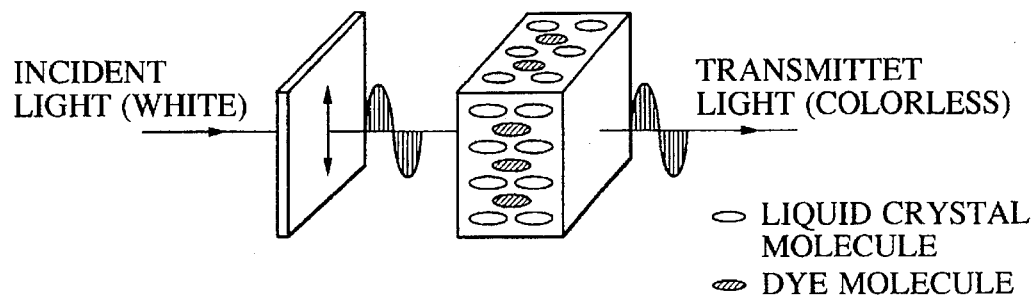
○ LIQUID CRYSTAL MOLECULE
⬗ DYE MOLECULE

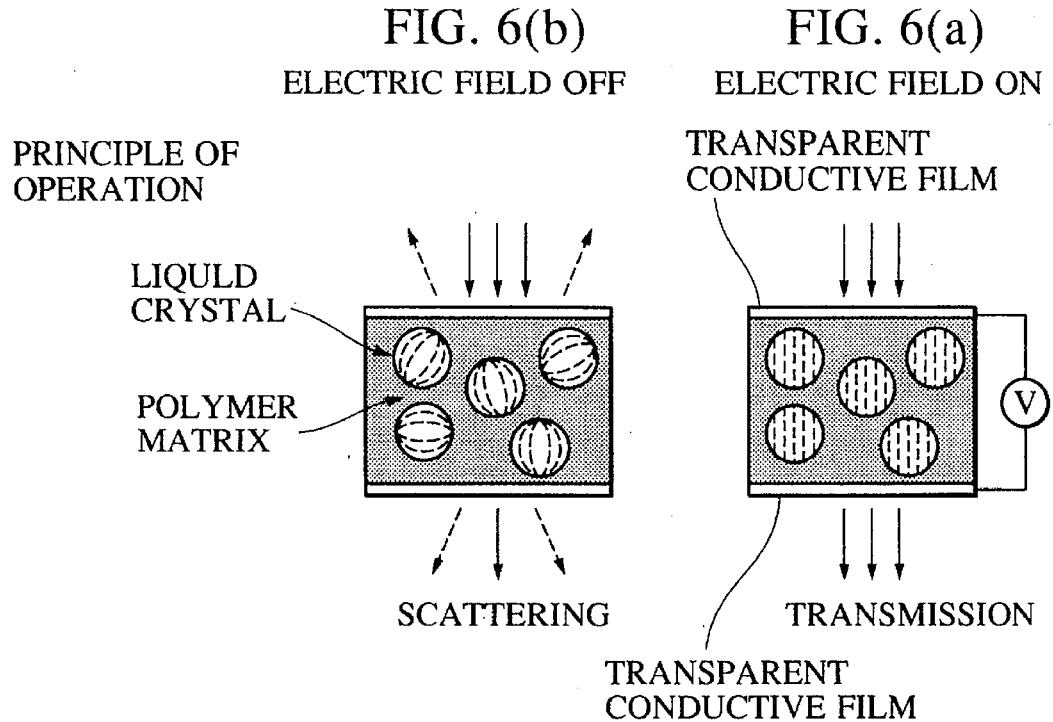
FIG. 6(b) ELECTRIC FIELD OFF
FIG. 6(a) ELECTRIC FIELD ON
PRINCIPLE OF OPERATION
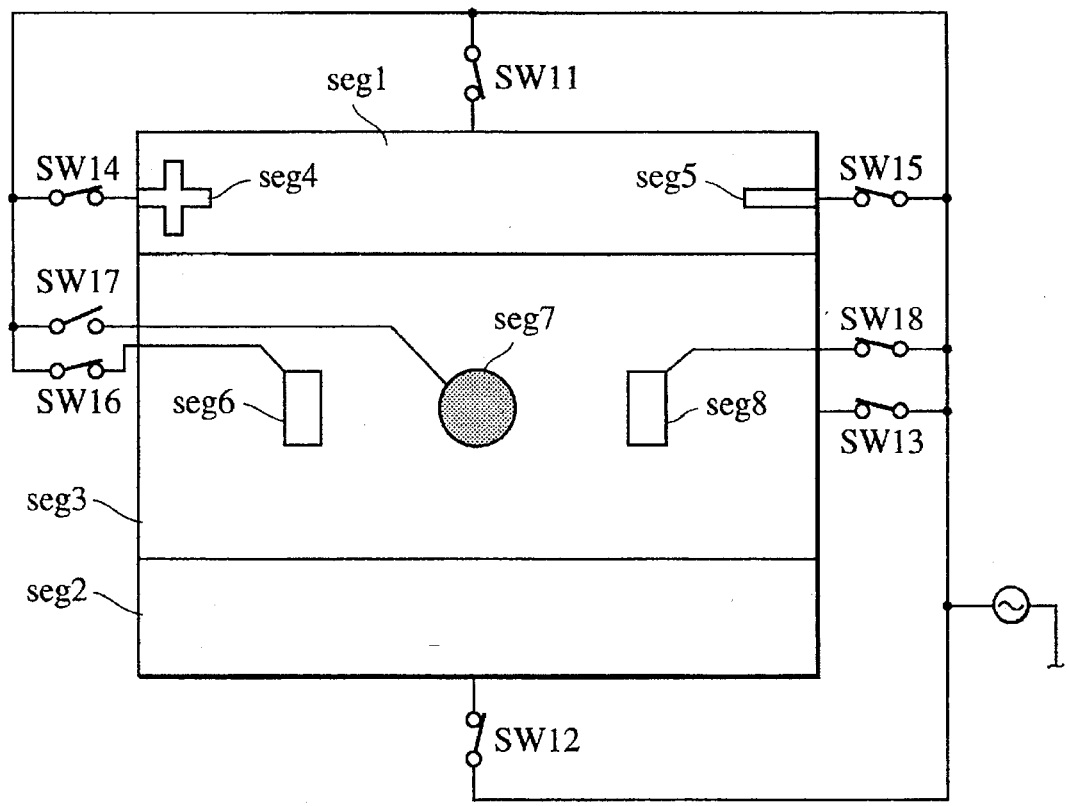
FIG. 7

| FIG. 12A | FIG. 12B |

# OPTICAL APPARATUS INCLUDING A LIGHT MODULATION FINDER OPTICAL SYSTEM

BACKGROUND OF THE INVENTION

1. Field of the Invention

The present invention relates to an optical apparatus such as a camera in which a light modulation element such as a transmission type liquid crystal display element is disposed in a finder optical system.

2. Description of the Related Art

Many cameras have previously been proposed in which a transmission type liquid crystal element is disposed in the visual field of a finder optical system, and shielding and transmission states of light incident on the element are controlled by turning on and off the applied voltage for performing various displays. Such cameras frequently use a light modulation element, which uses an TN or GH type liquid crystal element and which is brought into a non-transmission state by applying the voltage thereto (posi-type). However, since the voltage applied to transparent electrodes having a display pattern is controlled, the visual field of a finder is not entirely brought into the non-transmission state.

On the other hand, cameras using a light modulation element which uses a PDL (Polymer-Dispersed Liquid Crystal) or GH type liquid crystal element and which causes a transmission state by applying a voltage have also been proposed (nega-type). In this type of light modulation element, a non-transmission state is established when no voltage is applied.

A camera with a TTL type auto-focus (AF) system frequently has the problem of the presence of noise light entering from a finder. In normal use, this is little problem because a photographer looks through the finder. However, for example, when a photographer does not look through the finder, an undesirable light entering through an eyepiece enters the AF systems from the finder side, and sometime causes unexpected adverse effects on AF system.

SUMMARY OF THE INVENTION

The present invention has been achieved in consideration of the above problem, and an object of the present invention is to provide an improved optical apparatus comprising a light modulation element disposed in a finder.

In accordance with a first aspect of the present invention, there is provided an optical apparatus comprising:

a projection optical system for projecting an image of an object;

a detection system for detecting a defocus state of the image of the object on a photosensitive plane with a light emitted from the projection optical system;

a finder system for observing the object with a light emitted from the projection optical system, the finder system comprising light modulation means for creating a light transmission state when electric energy is input, and creating a light cut off or light shielding state when no electric energy is input, and the light modulation means being disposed so as to cover the visual field of the finder system; and control means for controlling the input of the electric energy into the light modulation means so that no electric energy is input when the user of the optical apparatus does not look through the finder system.

In accordance with a second aspect of the present invention, there is provided an optical apparatus comprising:

a projection optical system for projecting an image of an object;

a finder system for observing the object with a light emitted from the projection optical system, the finder system comprising light modulation means for creating one of a light transmission state and a light cut off or light shielding state in accordance with one of the presence or absence of input of electric energy, and the light modulation means being disposed so as to cover the view field of the finder system;

means for detecting whether an eye of a user of the optical apparatus contacts the finder system;

a switch for starting the optical apparatus making preparations for photographing; and control means for controlling the light modulation means so as to bring an entirety of a plane of the light modulation means into the light transmission state when it is detected that the user's eye contacts the finder system, and then bring a portion of the light modulation means into the cut off or shielding state when the switch is turned on.

In accordance with a third aspect of the present invention, there is provided an optical apparatus comprising:

a projection optical system for projecting an image of an object;

a finder system for observing the object with a light emitted from the projection optical system, the finder system comprising light modulation means for creating one of a light transmission state and a light cut off or light shielding state in accordance with one of the presence or absence of input of electric energy, and the light modulation means being disposed so as to cover the view field of the finder system;

means for detecting whether an eye of a user of the optical system contacts the finder system; and control means for controlling the input of electric energy into the light modulation means so that no electric energy is input when the user does not look through the finder system.

In accordance with a fourth aspect of the present invention, there is provided an optical apparatus comprising:

a projection optical system for projecting an image of an object;

a finder system for observing the object with a light emitted from the projection optical system, the finder system comprising light modulation means for creating one of a light transmission state and a light cut off or light shielding state in accordance with the presence or absence of input of electric energy, and the light modulation means being disposed so as to cover the view field of the finder system; and control means for controlling the input of the electric energy into the light modulation means so as to input first electric energy to the light modulation means when a command signal is supplied, and input second electric energy with intensity lower than the first electric energy when no command signal is supplied.

In accordance with a fifth aspect of the present invention, there is provided an optical apparatus comprising:

a projection optical system for projecting an image of an object;

a finder system for observing the object with a light emitted from the projection optical system, the finder system comprising light modulation means for creating one of a light transmission state and a light cut off or light shielding state in accordance with the presence or not of input of electric energy, and the light modulation means being disposed so as to cover the view field of the finder system; and control means for controlling the input of the electric energy into the light modulation means so as to input first electric energy to the light modulation means when a command signal is supplied, and input second electric energy with a frequency lower than the first electric energy when no command signal is supplied.

BRIEF DESCRIPTION OF THE DRAWINGS

FIGS. 4(a) and 4(b) are drawings illustrating the principle of the operation of a TN type liquid crystal device, which can be used as the liquid crystal finder display shown in FIG. 1;

FIGS. 5(a) and 5(b) are drawings illustrating the principle of the operation of a GH type liquid crystal device, which can be used as the liquid crystal finder display shown in FIG. 1;

FIGS. 6(a) and 6(b) are drawings illustrating the principle of the operation of a PDLC type liquid crystal device used as the liquid crystal finder display in an embodiment of the present invention;

FIG. 7 is a drawing illustrating a method of applying an electric field to a liquid crystal finder display comprising a liquid crystal device;

DETAILED DESCRIPTION OF THE PREFERRED EMBODIMENTS

Figure 1:
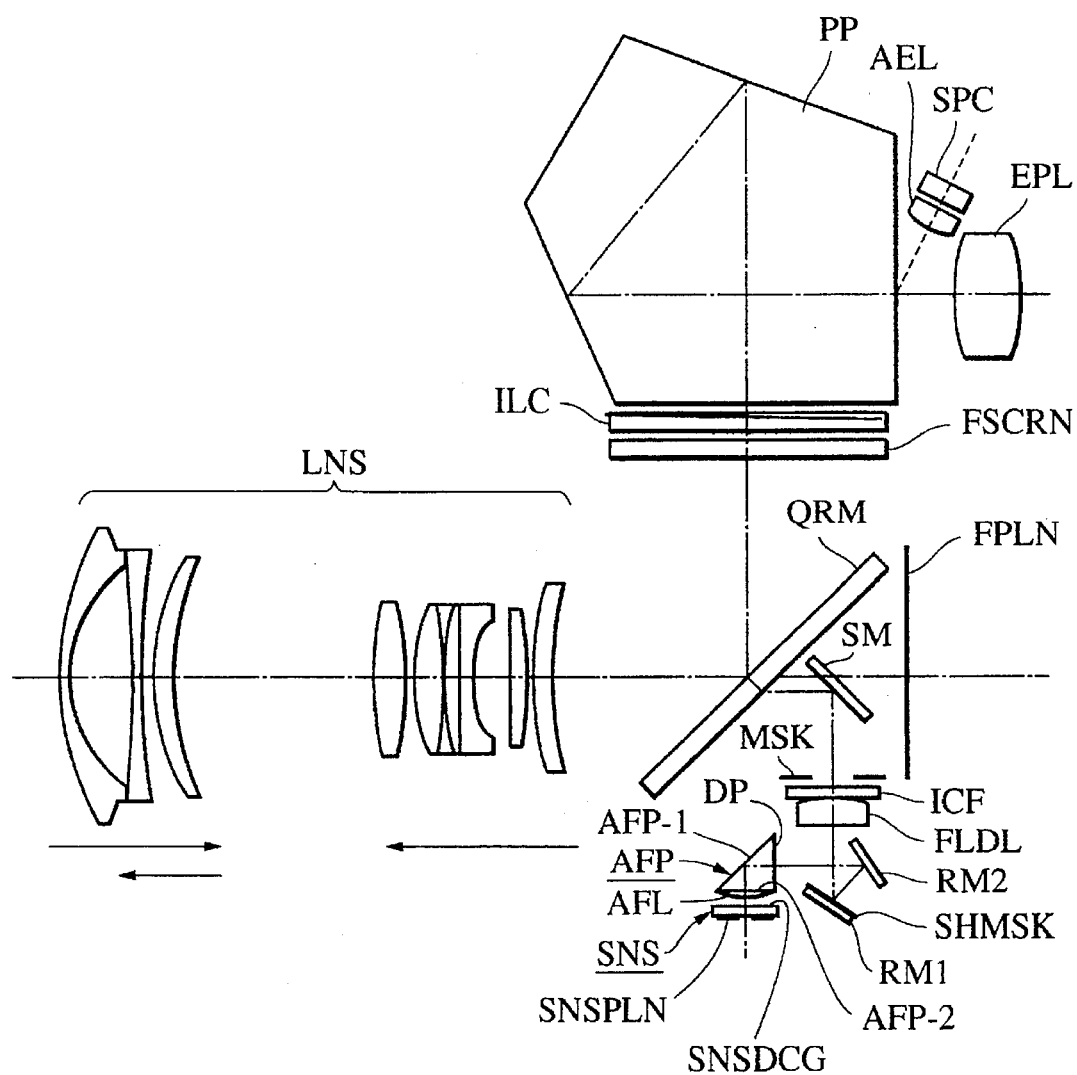
FIG. 1 is a drawing illustrating the arrangement of an optical system of a camera provided with a liquid crystal finder display and a focusing point detector in accordance with a first embodiment of the present invention.

The present invention is described in detail below with reference to the embodiments shown in the drawings.

FIG. 1 is a drawing illustrating the arrangement of an optical system of a single-lens reflex camera provided with a liquid crystal display and a focusing point detector (AF system) in accordance with a first embodiment of the present invention.

In FIG. 1, reference character LNS denotes a zoom photographic lens; reference character QRM, a quick return mirror; reference character FSCRN, a focusing screen; reference character ILC, a liquid crystal finder display; reference character PP, a pentaprism; reference character AEL, a photometric lens; reference character SPC, a photometric sensor; reference character EPL, an eyepiece lens; reference character FPLN, a film plane; reference character SM, a submirror; reference character MSK, a visual field mask; reference character ICF, an infrared cut filter; reference character FLDL, a field lens; reference characters RM1 and RM2, first and second reflecting mirrors, respectively; reference character SHMSK, a shielding mask; reference character DP, a diaphragm; reference character AFL, a secondary image formation lens; reference character AFP, a prism member having a reflecting plane AFP-1 and an exit plane AFP-2; and reference character SNS, a line sensor having a cover glass SNSDCG and a light receiving plane SNSPLN.

The prism member AFP has the reflecting plane AFP-1 formed by depositing a reflecting metal film of aluminum or the like, and functions to reflect the light emitted from the secondary image formation lens AFL to deflect the light to the exit plane AFP-2.

Figure 2:
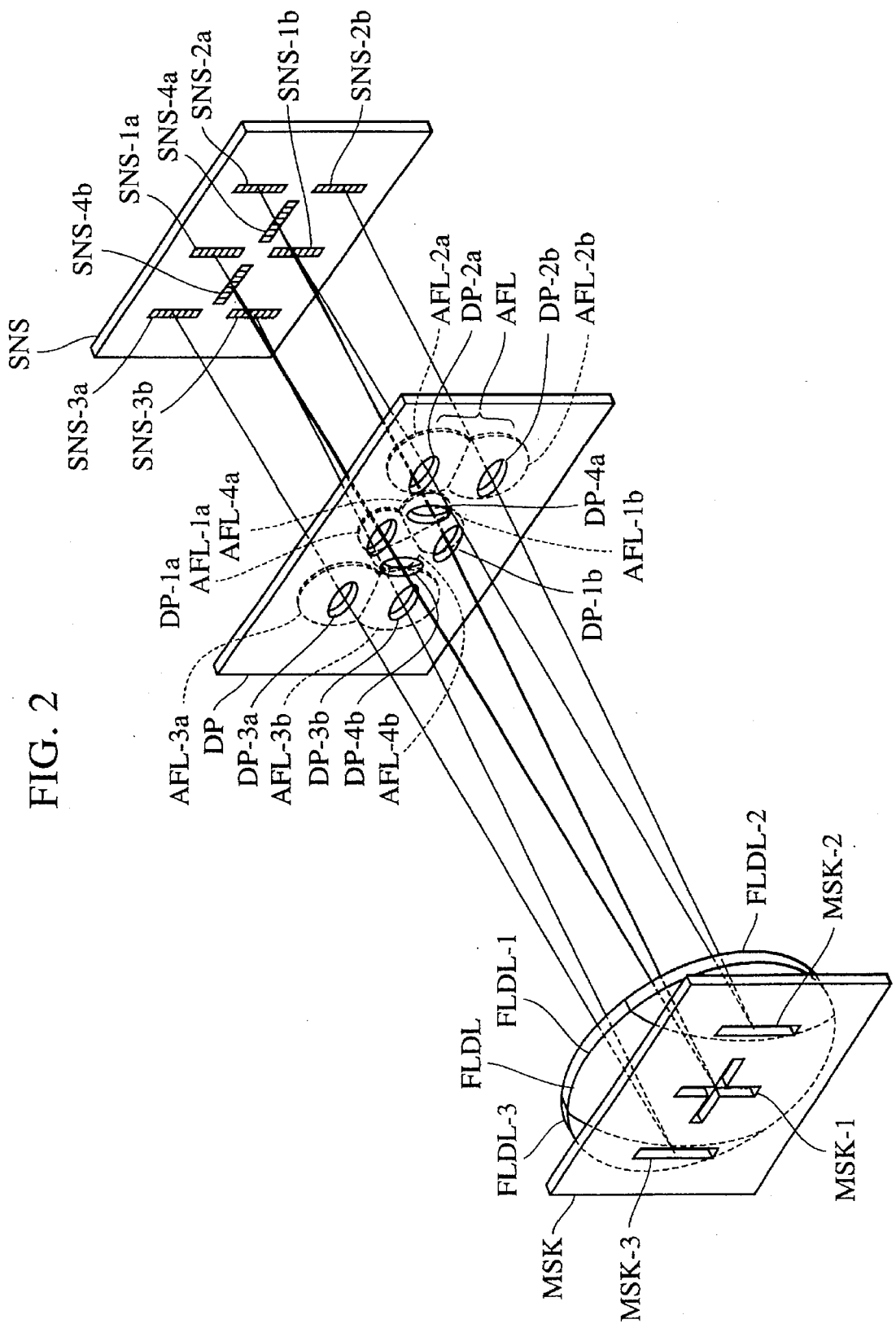
FIG. 2 is a perspective view illustrating the optical system of the focal point detector shown in FIG. 1.

FIG. 2 is a drawing illustrating the schematic configuration of the above focal point detector.

In FIG. 2, reference character MSK denotes a visual field mask which has a cross-shaped opening MSK-1 at the center thereof, and longitudinal openings MSK-2 and MSK-3 formed in the peripheral portions on the both sides thereof. Reference character FLDL denotes a field lens comprising three portions FLDL-1, FLDL-2 and FLDL-3 corresponding to the three openings MSK-1, MSK-2 and MSK-3, respectively, of the visual field mask MSK. Reference character DP denotes a diaphragm having, in the central portion thereof, a pair of openings in each of the longitudinal and lateral directions, i.e., four openings DP-1a, DP-1b, DP-4a and DP-4b in total, and a pair of openings in each of the right and left peripheral portions thereof, i.e., openings DP-2a, DP-2b and DP-3a, DP-3b, respectively.

The portions FLDL-1, FLDL-2 and FLDL-3 of the field lens FLDL have the functions of forming images of the opening pairs DP-1, DP-2 and DP-3, respectively, in the vicinity of an exit pupil of an objective lens (not shown).

Reference character AFL denotes the secondary image formation lens comprising four pairs of lenses, i.e., eight lenses AFL-1a, AFL-1b, AFL-4a, AFL-4b, AFL-2a, AFL-2b, AFL-3a and AFL-3b, and disposed behind the diaphragm in correspondence with the openings, respectively, thereof. Reference character SNS denotes a line sensor comprising four pairs of sensor lines, i.e., eight sensor lines SNS-1a, SNS-1b, SNS-4a, SNS-4b, SNS-2a, SNS-2b, SNS-3a and SNS-3b in total, which are arranged to respectively receive images of the lenses of the secondary image formation lens AFL corresponding thereto. The sensor lines SNS-1a, SNS-1b and SNS-3a, SNS-3b respectively correspond to the right and left focal point detection regions in the finder, and the sensor lines SNS-4a, SNS-4b and SNS-2a, SNS-2b correspond to a focal point detection region in the central portion of the finder.

In the focusing point detection system shown in FIG. 2, when the focusing point of the photographic lens is in front of the film plane, the object images formed on the sensor lines approach each other, and when the focusing point is behind the film plane, the object images separate from each other. Since the relative positional displacement of these objective images has a specified functional relation to the deviation of the focusing point of the photographic lens, the deviation of the focusing point, i.e., the defocus amount, of the photographic lens can be detected by appropriately processing the sensor output from each of the sensor line pairs.

Figure 3A:
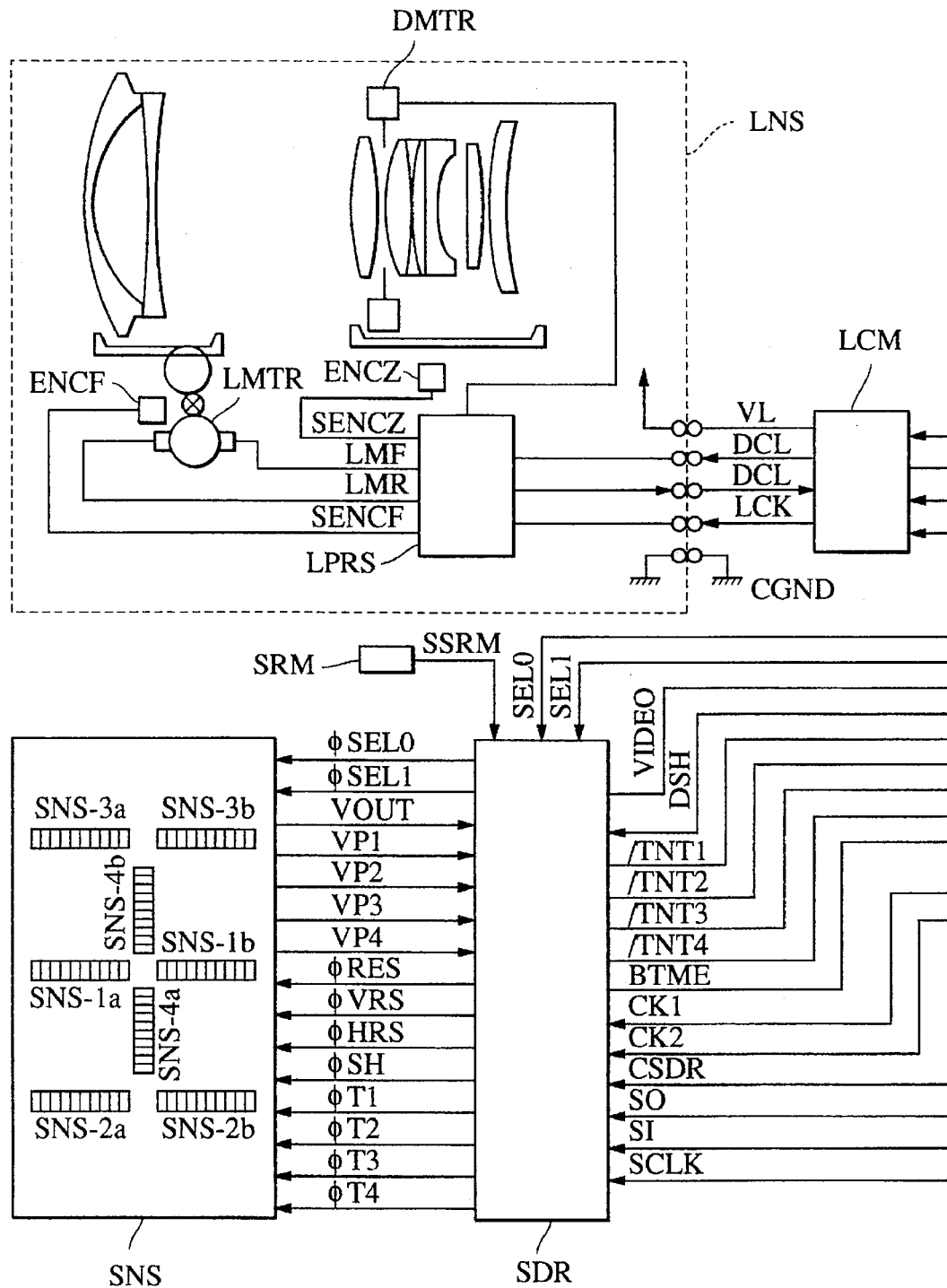
FIGS. 3A and 3B is a block diagram illustrating the electrical configuration of the camera in accordance with the first embodiment of the present invention.
Figures 3, 3B:
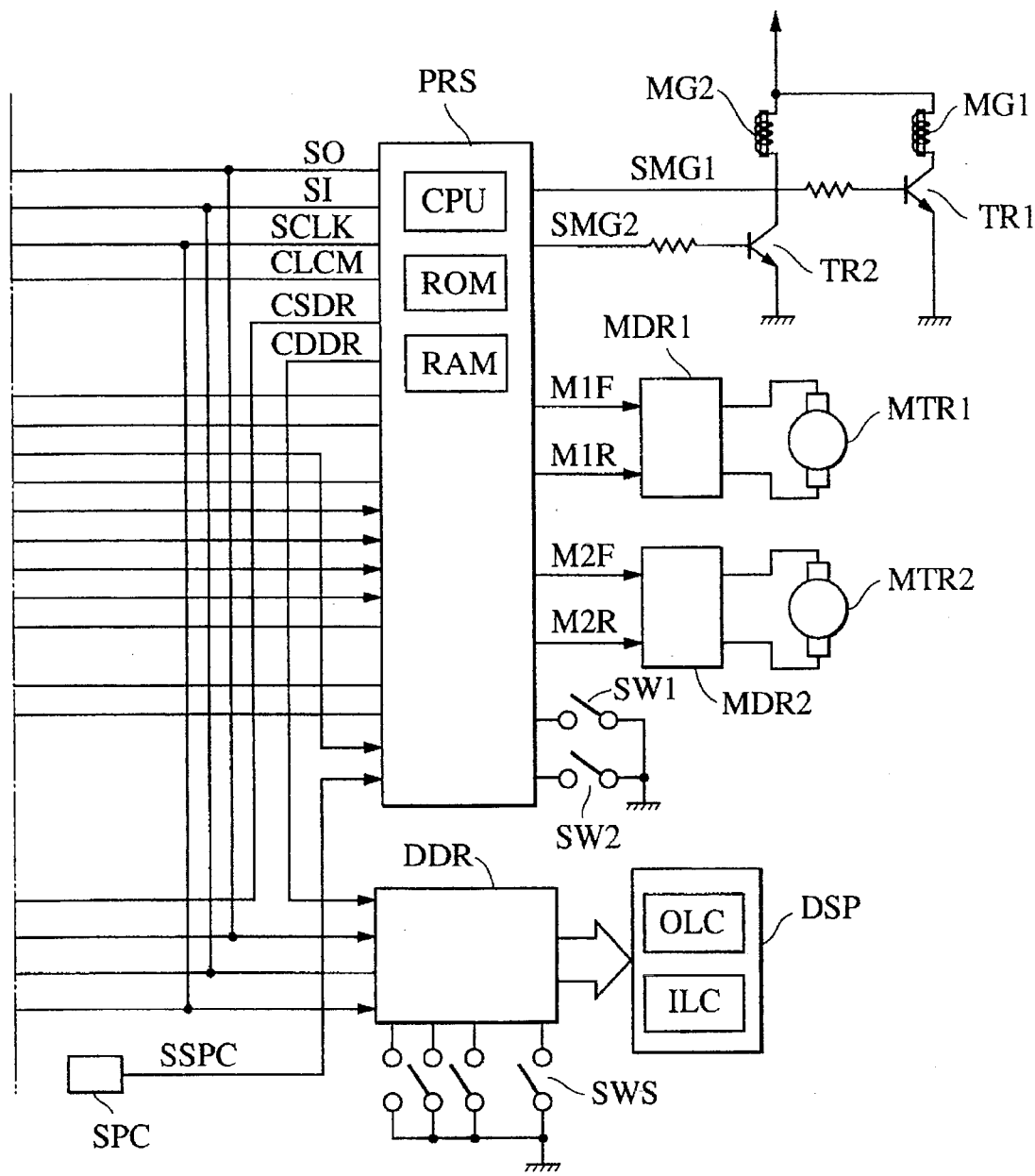
FIG. 3 comprising

FIGS. 3A and 3B are block diagrams illustrating a typical example of configuration of a camera provided with the devices shown in FIGS. 1 and 2.

In FIGS. 3A and 3B, reference character PRS denotes a camera control circuit, for example, comprising a one-chip microcomputer containing CPU (central processing unit), ROM, RAM and A/D conversion functions. The control circuit PRS performs a series of camera operations such as the automatic exposure control function, autofocusing function, film winding and rewinding function, etc. in accordance with a camera sequence program contained in the ROM. The control circuit PRS thus controls the operation of each of the circuits and the lens portion by communicating with peripheral circuits in the camera body and a control device in the lens portion (on the lens barrel side) using communication signals SO, SI and SCLK and communication selection signals CLCM, CSDR and CDDR.

Reference character SO denotes a data signal output from the control circuit PRS, reference character SI denotes a data signal input to the control circuit PRS, and reference character SCLK denotes a synchronous clock signal for both signals SO and SI.

Reference character LCM denotes a lens communication buffer circuit supplying electric power to a lens power supply terminal VL during operation of the camera, and serving as a communication buffer between the camera and the lens when the selection signal CLCM output from the control circuit PRS is at a high voltage level (abbreviated to "H" hereinafter, a low voltage level is abbreviated to "L").

When the control circuit PRS brings the communication selection signal CLCM in "H" and sends a predetermined data signal SO synchronously with the synchronous clock signal SCLK, the lens communication circuit LCM outputs buffer signals LCK and DCL of the signals SCLK and SO, respectively, to the lens portion through a communication contact between the camera and the lens portion. At the same time, the lens communication circuit LCM outputs a buffer signal SI of the signal DLC output from the lens portion, and the control circuit PRS inputs data about the lens from the signal SI synchronously with the signal SCLK.

Reference character DDR denotes a circuit for detecting various switches SWS and displaying, the circuit being selected when a signal CDDR is "H" and controlled by the control circuit PRS using the signals SO, SI and SCLK. Namely, the circuit DDR switches the display states of a display circuit DSP2 based on the data transmitted from the control circuit PRS of the camera, and informs the control circuit PRS of the on-off state of each of the operating members of the camera by means of communication.

Reference characters SW1 and SW2 respectively denote switches interlocked with a release button (not shown). The switch SW1 is turned on when the release button is pushed in a first stage, and the switch SW2 is turned on when the release button is subsequently pushed in a second stage. The control circuit PRS performs photometry and autofocusing when the switch SW1 is turned on, and then performs exposure control and subsequent film winding operations when triggered by turning on of the switch SW2.

The switch SW2 is connected to an interrupt input terminal of the control circuit PRS comprising a computer so that even during the time a program is executed by turning on the switch SW1, when an interruption is made by turning on the switch SW2, the control by the control circuit PRS can immediately be transferred to a predetermined interrupt program.

Reference characters MTR1 and MTR2 denote a motor for feeding a film and a motor for moving mirror upward and downward and charging a shutter spring, respectively, normal and reverse rotations thereof being controlled by driving circuits MDR1 and MDR2, respectively. Signals M1F, M1R, M2F and M2R input to the driving circuits MDR1 and MDR2 from the control circuit PRS are signals for controlling the motors MTR1 and MTR2.

Reference characters MG1 and MG2 denote electromagnets for starting the travels of front and rear shutter curtains, respectively. When electricity is charged to the electromagnets MG1 and MG2 through signals SMG1 and SMG2 and amplification transistors TR1 and TR2, respectively, the shutter is controlled by the control circuit PRS.

Since controls of the motor driving circuits MDR1 and MDR2 and of the shutter are not related directly to the present invention, the detailed description thereof is omitted.

The signal DCL input to the control circuit LPRS in the lens synchronously with the signal LCK indicates command data supplied to the lens LNS from the camera, the operation of the lens in response to the command being previously determined. The control circuit LPRS in the lens analyzes the command in accordance with a predetermined procedure and controls autofocusing and the diaphragm to output signals indicating the operating states of the members of the lens (the driving state of the focusing optical system, the driving state of the diaphragm, etc.) and various parameters (an aperture f-number, a focal distance, a coefficient of movement of the focusing optical system to the defocusing amount, etc).

This embodiment concerns an example of zoom lenses in which when a focusing command is transmitted from the camera, the focusing motor LMTR is driven by the signals LMF and LMR in accordance with the driving amount and direction which are simultaneously transmitted thereto to move the optical system along the optical axis for focusing the camera. The movement of the optical system is measured by a method in which a pulse signal SENCF of an encoder circuit ENCF which detects a pattern of a pulse plate (scale) rotated in interlock with the optical system by a photocoupler, and a number of pulses output corresponding to the movement are monitored and counted by a counter in the control circuit LPRS in the lens. When a predetermined movement is completed, the control circuit LPRS in the lens brings the signals LMF and LMR in "L" by itself and controls the motor LMTR.

After a focusing command is once transmitted from the camera, therefore, the control circuit PRS of the camera need not take part in driving the lens until driving of the lens is completed. The content of the counter can also be transmitted to the camera if requested from the camera.

When a command to control the diaphragm is output from the camera, a stepping motor DMTR which is known as a diaphragm driving motor is driven in accordance with the diaphragm stage number simultaneously transmitted. Since the stepping motor DMTR permits open control, an encoder for monitoring the operation thereof is unnecessary.

Reference character ENCZ denotes an encoder circuit attached to the zoom optical system, the control circuit LPRS in the lens detecting a zoom position (the position of a variator lens) by the signal SENCZ input from the encoder circuit ENCZ. Lens parameters at each zoom position are stored in the control circuit LPRS in the lens so that the parameters corresponding to the present zoom position are sent to the camera when required from the control circuit PRS on the camera side.

Reference character SPC denotes a photometric sensor for controlling exposure, which receives light reflected from the object and passed through the photographic lens. The output SSPC of the photometric sensor SPC is input to an analog input terminal of the control circuit PRS, subjected to A/D conversion and then used for automatic exposure control in accordance with the predetermined program.

Reference character SDR denotes a sensor driving circuit comprising CCD or the like for the line sensor SNS for detecting the focal point. The sensor SDR is a circuit for processing the output SSRM from a sensor SRM for receiving a signal from a remote controller (not shown). The sensor SDR is selected when the signal CSDR is "H" and is controlled by the control circuit PRS by using the signals SO, SI and SCLK.

The signals φSEL0 and φSEL1 which are supplied to the line sensor SNS from the sensor driving circuit SDR are signals SEL0 and SEL1, respectively, supplied from the control circuit PRS, for selecting the sensor line SNS-1 (SNS-1a and SNS-1b) when φSEL0="L" and φSEL1="L", the sensor line SNS-4 (SNS-4a d SNS-4b) when φSEL0="H" and φSEL1="L", the sensor line SNS-2 (SNS-2a and SNS-2b) when φSEL0="L" and φSEL1="H", and the sensor line SNS-3 (SNS-3a d SNS-3b) when φSEL0="H" and φSEL1="H".

After completion of storage, when the signals SEL0 and SEL1 are appropriately set, and clocks φSH and φHRS are sent to the line sensor SNS, the image signals of the sensor line selected by the signals SEL0 and SEL1 (φSEL0 and φSEL1) are successively serially output from output VOUT.

Reference characters VP1, VP2, VP3 and VP4 denote monitor signals output from object luminance monitors which are disposed near the sensor lines SNS-1 (SNS-1a and SNS-1b), SNS-2 (SNS-2a and SNS-2b), SNS-3 (SNS-3a and SNS-3b) and SNS-4 (SNS-4a and SNS-4b), respectively. The voltage of each of the monitor signals is increased with the start of storage, and thus the storage of each of the sensor lines is controlled by an increase in voltage.

Signals φRES and φVRS are reset clocks, the signals φHRS and φSH are read clocks for the image signals, and φT1, φT2, φT3 and φT4 are clocks for respectively terminating the storage in the pairs of sensor lines.

The output VIDEO from the sensor driving circuit SDR is an image signal which is obtained by determining a difference between the image signal output from the line sensor SNS and dark current output and then amplifying the difference with the gain determined by the luminance of the object. The dark current output represents the output of pixels in the sensor lines, which are shielded from light, and is held in a capacitor of the sensor driving circuit SDR by the signal DSH from the control circuit PRS. Differential amplification between the image signal and the dark current output is performed. The output VIDEO is input to the analog input terminal of the control circuit PRS, and the digital values obtained by A/D conversion of the output VIDEO are successively stored at predetermined addresses on the RAM of the control circuit PRS.

Signals /TNT 1, /TNT 2, /TNT 3 and /TNT 4 are Signals indicating the end of storage in the sensor lines SNS-1 (SNS-1a and SNS-1b), SNS-2 (SNS-2a and SNS-2b), SNS-3 (SNS-3a and SNS-3b) and SNS-4 (SNS-4a and SNS-4b) wherein the proper amounts of charge are stored. When receiving these signals, the control circuit PRS executes reading of the image signals.

A signal BTME is a signal for timing the determination of a read gain of an image signal amplifier in the sensor driving circuit SDR. When this signal BTME becomes "H", the sensor driving circuit SDR determines the read gains of the sensor lines on the basis of the voltages of the corresponding monitor signals VP1 to VP4. Specifically, the read gains are determined by the relation between the comparative level generated on the basis of the gain decision data previously transmitted from the control circuit through the signals SCLK and SO, and the levels of the monitor signals VP1 to VP4 at timing by the signal BTME. In this embodiment, the comparative level is common to the monitor signals VP1 to VP4.

Signals CK1 and CK2 are reference clocks given to the sensor driving circuit SDR from the control circuit PRS to generate the clocks φRES, φVRS, φHRS and φφSH.

When the control circuit PRS makes "H" the communication selection signal CSDR, and outputs a predetermined command to start the storage in the sensor driving circuit SDR, the operation of storage in the line sensor SNS is started.

The object image formed on each of the sensors of the four pairs of sensor lines is subjected to photoelectric conversion to store charge in the photoelectric conversion elements of the line sensor SNS. At the same time, the signals VP1 to VP4 of the luminance monitor sensors for the respective sensor lines are increased. When the voltages reach the predetermined level, each of the signals /TNT 1 to /TNT 4 becomes "L" in the sensor driving circuit SDR.

When the control circuit receives the signals /TNT 1 to /TNT 4, it outputs a predetermined waveform as the clock CK2. The sensor driving circuit SDR generates the clocks φSH and φHRS on the basis of the reference clock CK2 and outputs the clocks to the line sensor SNS. The line sensor SNS outputs image signals based on the clocks, and the control circuit PRS performs, synchronously with the clock CK2 output by itself, A/D conversion of the output VIDEO input to the analog input terminal by the A/D conversion function contained therein, and then successively stores the resultant digital signals at the predetermined addresses in the RAM. Then, predetermined detection and calculation of the focal point are performed to determine the defocusing amount of the photographic lens.

Since the operations of the sensor driving circuit SDR and the line sensor SNS are disclosed with respect to a focal detector having two pairs of sensor lines in Japanese Patent Laid-Open No. 2-64517, they are not described in detail below.

On the other hand, in the state wherein the camera waits for a remote control, i.e., a remocon, signal, the sensor driving circuit SDR changes the output from the receiving sensor SRM time division signal based on the reference clocks CK1 and CK2 and outputs a command received from the remote controller to the control circuit PRS by the signals SCLK and SI.

The liquid crystal finder display ILC shown in FIG. 1 is described below.

FIGS. 4(a) and 4(b) are drawings illustrating the principle of the operation of the display ILC comprising a TN-type (Twist Nematic type) liquid crystal plate held between polarizers crossing at right angles.

In a state without application of a voltage to the liquid crystal, i.e., no electric field is applied (the state shown in FIG. 4(a)), light incident on the liquid crystal plate is rotated by 90° in accordance with the twisting of liquid crystal molecules to create a bright transmission state. In a state with application of a voltage (the state shown in FIG. 4(b)), since the twisting of the liquid crystal molecules disappears, a dark cutoff state is established. In a structure comprising parallel polarizers, the transmission state and cutoff state are reversed.

FIGS. 5(a) and 5(b) are drawings illustrating the principle of the operation of the ILC comprising a GH type (Guest Host type) liquid crystal plate and a polarizer.

In this case, in the state without application of a voltage (the state shown in FIG. 5(a)), since the direction of polarization agrees with the direction of light absorption by dye molecules, a transmitted light is colored due to light absorption. On the other hand, in the state with application of a voltage (the state shown in FIG. 5(b)), since the direction of polarization is perpendicular to the direction of light absorption, a transmission state is created due to no light absorption.

FIGS. 6(a) and 6(b) are drawings illustrating the principle of the operation of the ILC comprising a PDLC (Polymer-Dispersed Liquid Crystal) type plate in which a layer comprising a polymer resin and a liquid crystal is held between transparent conductive films to form a sheet.

Since the polymer resin forms a three-dimensional network structure, it is generally referred to as "a matrix".

In the state wherein an electric field is applied to the sheet, i.e., to each of the transparent conductive films (the state shown in FIG. 6(a)), since rod-like molecules of the liquid crystal are arranged in the direction of the electric field, the refractive index of the liquid crystal is the same as the resin, and thus incident light travels straight (transmission state), thereby making the sheet transparent. On the other hand, in the state where no electric field is applied (the state shown in FIG. 6(b)), the refractive indexes are different, thereby causing light scattering (cutoff state).

Description will be made with reference to the liquid crystal finder display ILC in this embodiment, which comprises the PDLC type plate shown in FIGS. 6(a) and 6(b) among the liquid crystal plates shown in FIGS. 4(a) through 6(b).

FIG. 7 is a drawing illustrating segments of the liquid crystal finder display ILC and the operation states thereof. This drawing illustrates a case as an example which has segments seg1 to seg8.

Segments seg1 and seg2 each indicate an area outside an area used for so-called panorama photograph, segment seg3 indicates the area for panorama photography, segments seg4 and seg5 indicate marks + and −, respectively, showing levels of over-exposure and under-exposure, and segments seg6 to seg8 respectively indicate the above three focusing point detection areas.

FIG. 7 shows the state wherein only segment seg7 is in the non-transmission state (electric field off), for example, as a result of focusing detection, focusing is achieved by selecting the central area. In FIG. 7, the state wherein the electric field of only the segment seg7 is turned off is shown by turning-off of a switch SW17.

Figure 8:
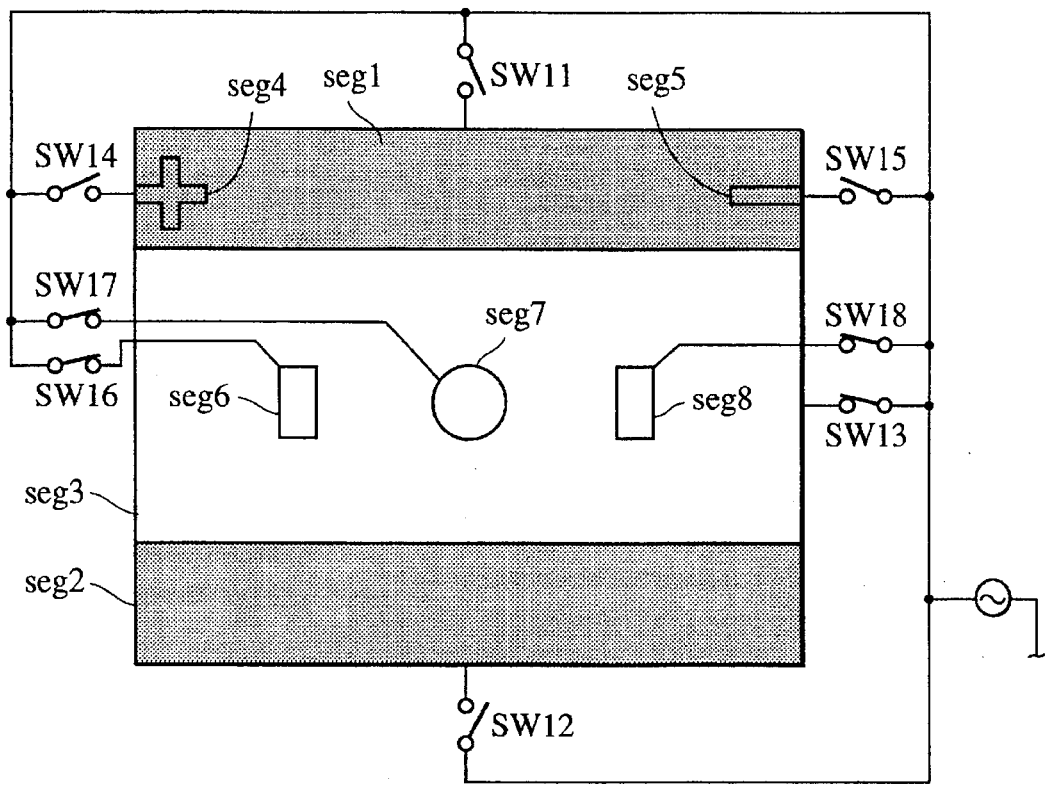
FIG. 8 is a drawing illustrating the display operation of the liquid crystal finder display shown in FIG. 7.

When an area is indicated in panorama photography, since four segments seg1, seg2, seg4 and seg5 may be brought into a display state (electric field off), only switches SW11, SW12, SW14 and SW15 are turned off, as shown in FIG. 8.

Figure 9:
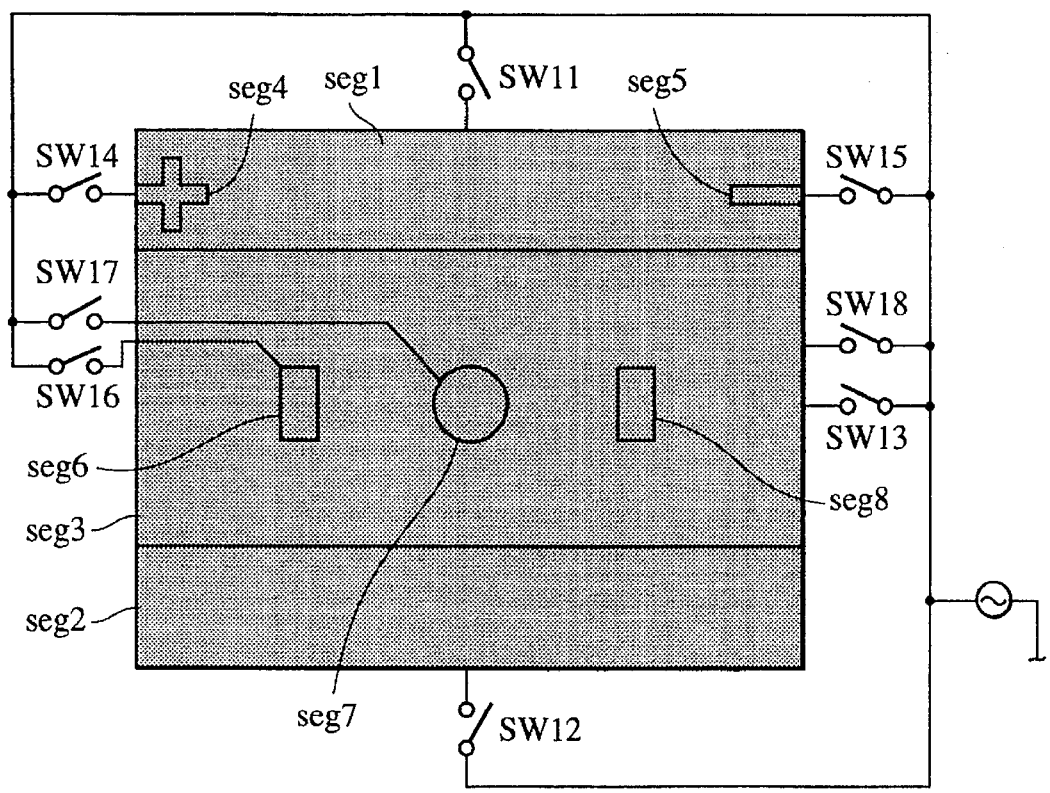
FIG. 9 is a drawing illustrating the display operation of the liquid crystal finder display shown in FIG. 7.

On the other hand, in order to minimize the noise light (back incident light) entering the AF system from the finder, all switches SW1 to SW8 may be turned off to bring the all segments seg1 to seg8 into the non-transmission state for shielding the whole visual field, as shown in FIG. 9.

Figure 10:
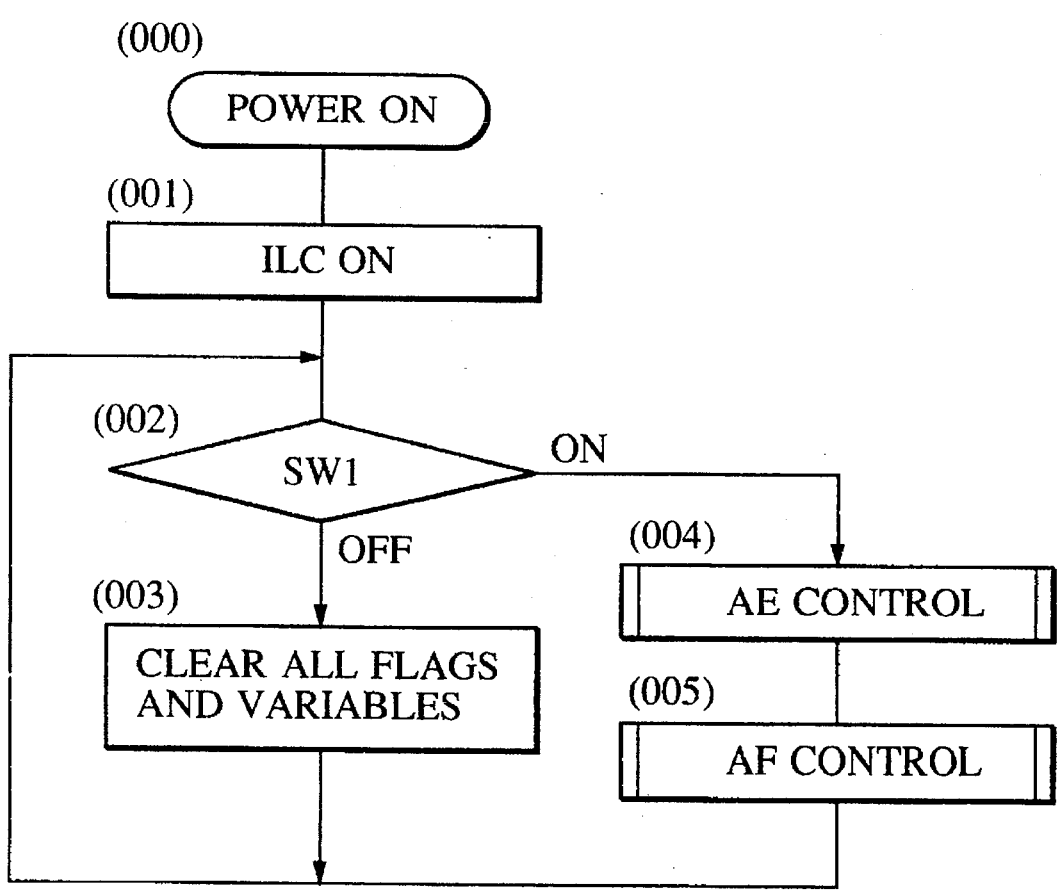
FIG. 10 is a flowchart illustrating the schematic operation of a camera having the configuration shown in FIG. 3.

FIG. 10 is a flowchart schematically showing the sequence for the entire camera.

When supply of electricity to the circuit shown in FIG. 3 is started, the microcomputer PRS starts the operation from step (000) through step (005) shown in FIG. 10.

The electric field of the liquid crystal finder display ILC is turned on to bring the entire visual field into the transmission state in step (001), and secure the photographic visual field of the camera for a photographer. The state of the switch SW1 which is turned on by pushing the release button in the first stage is detected in subsequent step (002). If the switch SW1 is turned off, the flow advances to step (003) for initializing all flags and variables, and returns to step (002) in which turning on of the switch SW1 is detected again.

On the other hand, if the switch SW is turned off in step (002), or if it is necessary to turn the switch SW1 on for remote operation by a remocon signal, interval photography or self-timer photography even if the switch SW1 is actually not turned on, the flow advances from step (002) to step (004) to start or continue the subsequent camera operation.

A subroutine for AE control is executed for performing photometry and detecting and displaying the states of various switches in step (004). When the AE control subroutine is completed, the flow advances to step (005).

AF control subroutine is executed in step (005) for storage in the line sensor SNS, detection and calculation of the focal point and autofocusing operation of lens driving. When the AF subroutine is completed, the flow returns to step (002) again, and the operation steps (004) and (005) are repeatedly executed until the switch SW1 is turned off.

In the flowchart of this embodiment, since the release operation is not related directly to the present invention, the description thereof is omitted.

Figure 11:
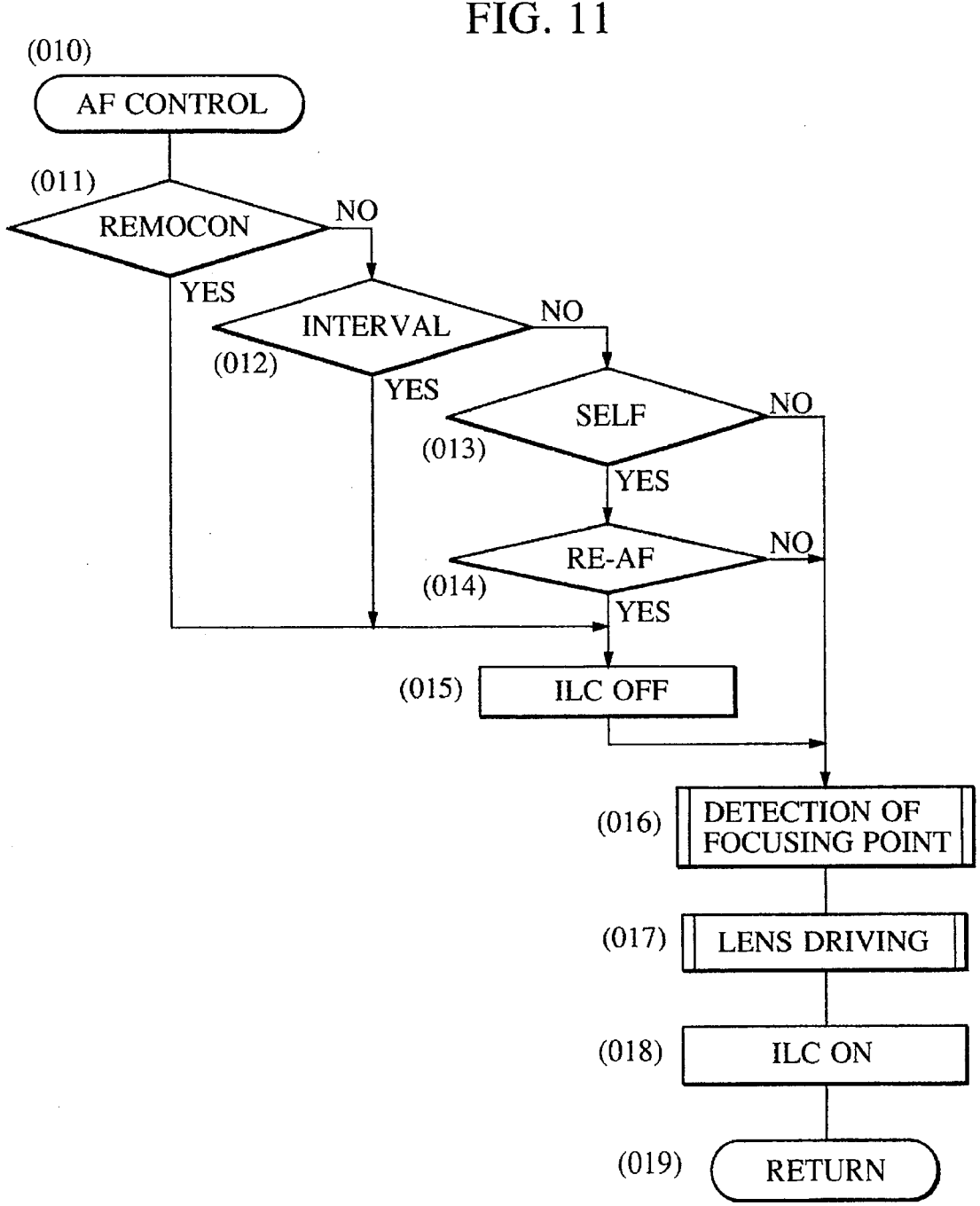
FIG. 11 is a flowchart illustrating an "AF control" subroutine in step (005) shown in FIG. 10.

FIG. 11 is a flowchart showing the AF control subroutine executed in the step (005) shown in FIG. 10.

When this AF control subroutine is called, the operations in step (011) and subsequent steps are executed through step (010).

A decision is made in step (011) as to whether or not the present operation is a remocon (remote control) mode. If the result is yes, the flow advances to step (015). If the result is no, the flow advances to step (012) where a decision is made as to whether the present operation is an interval photographic mode. If the result is no, the flow advances to step (015), and if the result is yes, the flow advances to step (013).

A decision is made in step (013) as to whether the present operation is a self-time mode. If the result is yes, the flow advances to step (014) in which decision is made as to whether autofocusing before exposure is being performed (again) (during AF operation). If the result is yes, the flow advances to step (015), while if the present operation is not the self-timer mode, or if the present operation is the self-timer mode, but it is decided in stop (014) that autofocusing before exposure is not being executed, the flow advances to step (016).

Since any one of =he above three states is decided in step (015), the entire liquid crystal finder display ILC is brought into the non-transmission state (electric field off), i.e., all switches SW11 to SW18 are turned off, as shown in FIG. 9, to minimize the back incident light entering the AF system from the finder.

The subroutine for focal detection is executed in the next step (016). In this step, an image signal is stored in each of the sensor lines for the operation of detecting the focal point, calculation is made for detecting the focal point from the read signals, and an area is selected for determining a target area for focusing.

The subroutine for lens driving is executed in the next step (017). In this step, the lens is driven on the basis of the defocusing amount obtained for the area determined in the above step (016). After the lens is completely driven, the flow advances to step (018) in which the liquid crystal finder display ILC is brought into the display state (electric field on), and the subroutine for AF control is terminated in the next step (019).

(Second embodiment)

In the above first embodiment, the electric field of the liquid crystal finder display ILC is turned off during auto-focusing in the mode in which the photographer does not look through the finder.

A construction is desired for more positively utilizing the effect of saving energy by cutting off the electric field, in which an eyepiece detector is provided for deciding whether the photographer looks through the finder, and the detection result shows that the photographer's eye does not contact the finder, the electric field of the liquid crystal finder display ILC is turned off. In this case, however, if the photometric sensor SPC for exposure control is disposed on the eyepiece lens side, not the side of the liquid crystal finder display ILC, in the finder optical system, even when the photographer's eye does not contact the finder, an electric field must be applied to the display ILC during the photometric operation for automatic exposure control. This is realized by the second embodiment of the present invention discussed below.

Figure 12A:
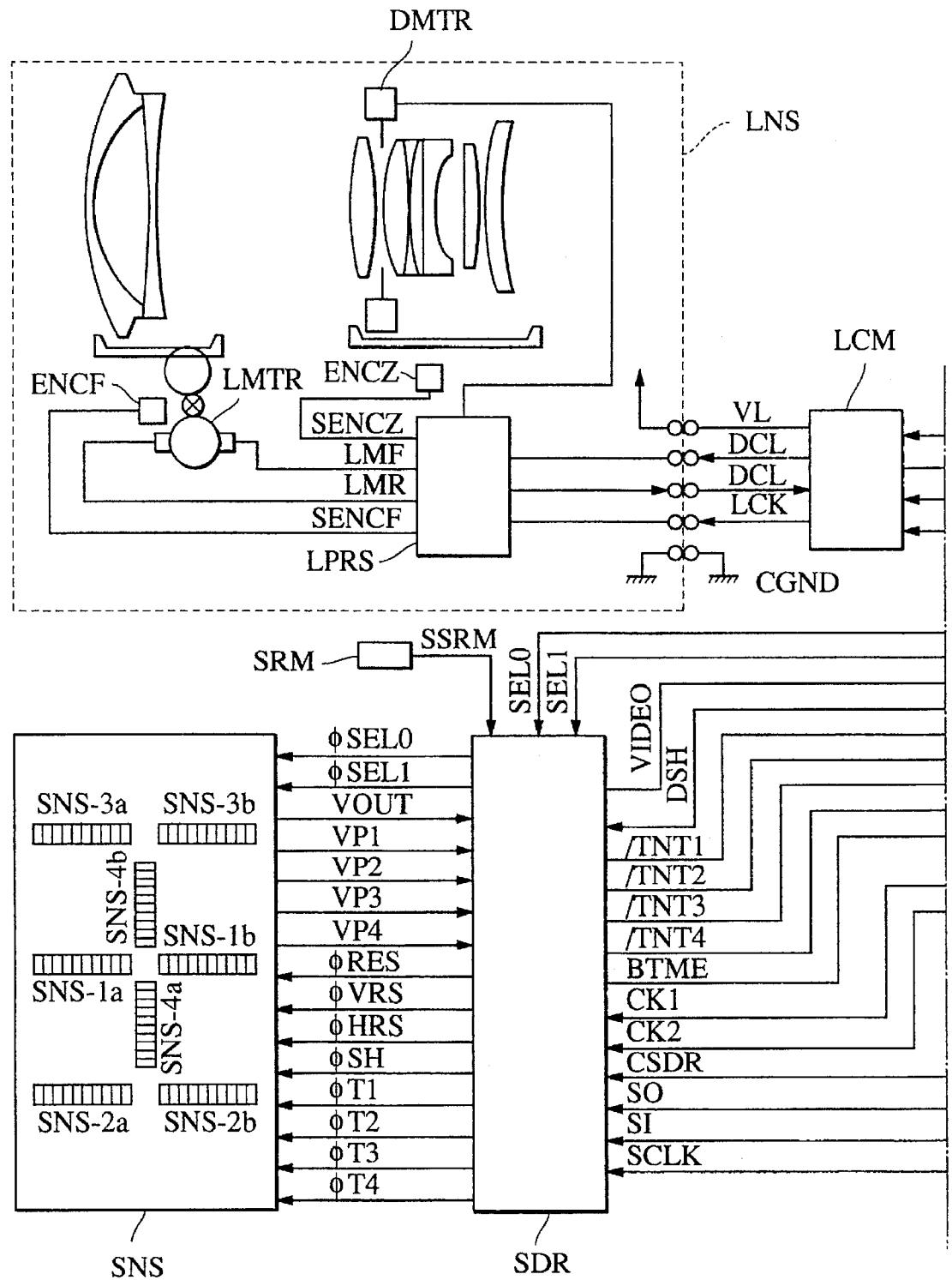
FIGS. 12A and 12B is a block diagram illustrating the electrical configuration of a camera in accordance with a second embodiment of the present invention.
Figures 12, 12B:
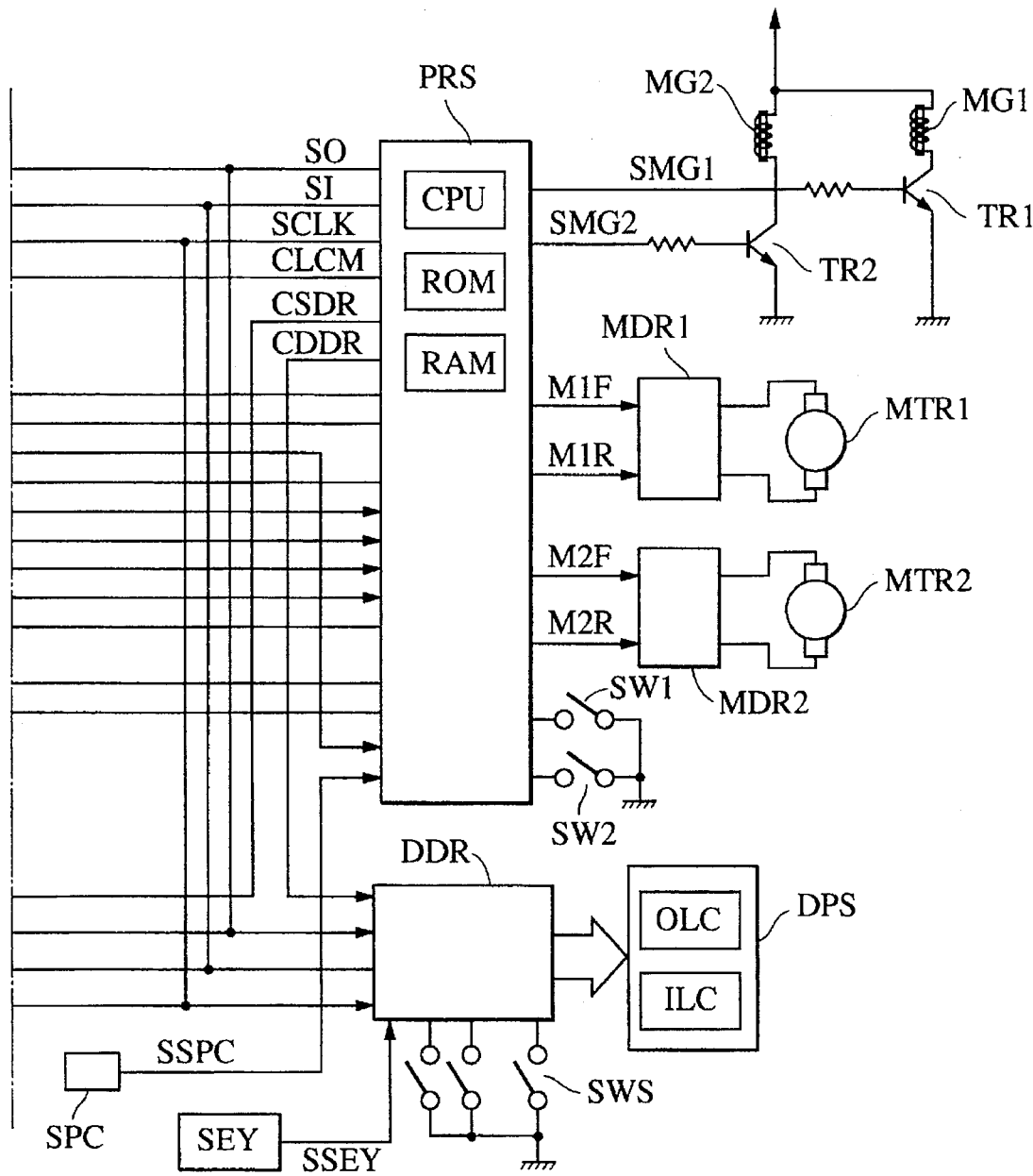
FIG. 12 comprising

FIGS. 12A and 12B are block diagrams illustrating the second embodiment of the present invention. The same portions as those shown in FIGS. 3A and 3B are denoted by the same reference numerals and are not described below.

The circuit of this embodiment is different from the circuit shown in FIGS. 3A and 3B in that an eye contact detection part SEY is provided so that the circuit DDR serves as a circuit for detecting various switches SWS and eye contact by the detection signal SSEY from the eye contact detection part SEY and providing a display.

The eye contact detection part SEY is provided with an eye contact detector comprising a projection LED and a light receiving sensor. If the output from the light receiving sensor exceeds a predetermined level, the eye contact detection signal SSEY is output to the circuit DDR. Since the eye contact detector is disclosed in Japanese Patent Laid-Open NO. 64-42639, the detailed description thereof is omitted.

Figure 13:
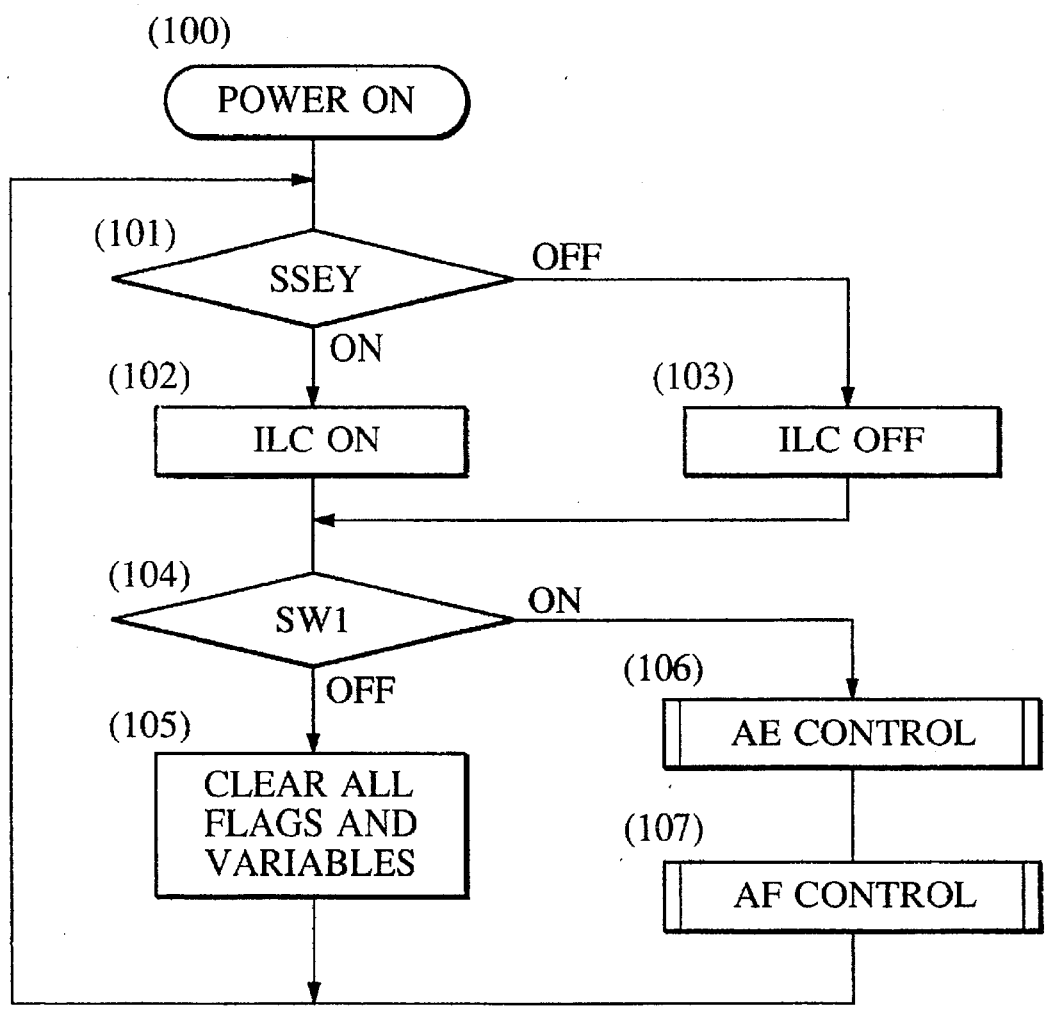
FIG. 13 is a flowchart illustrating the schematic operation of a camera having the configuration shown in FIG. 12.

FIG. 13 is a flowchart showing a rough sequence for a camera in the second embodiment of the present invention.

If supply of electricity to the circuit shown in FIGS. 12A and 12B is started, the operation of the micro computer PRS is started from step (101) through the step (100) shown in FIG. 13.

Decision is made in step (101) as to whether the eye contact detection signal SSEY is input. If the result shows that the signal SSEY is input, the flow advances to step (102) in which the electric field of the liquid crystal finder display ILC is turned on to secure the photographic visual field of the camera for the photographer. On the other hand, if the eye contact detection signal SSEY is not input, the flow advances to step (103) in which the electric field is turned off. In both cases, the flow then advances to step (104).

The state of the switch SW1 which is turned on by pushing the release button in the first stage is detected in the next step (104). If the switch SW is turned off, the flow advances to step (105) for initializing all flags and variables. The flow again returns to step (101) in which the liquid crystal finder display ILC is controlled in accordance with the result of eye contact detection. Turning on of the switch SW1 is detected in step (104).

On the other hand, if it is detected in step (104) that the switch SW1 is turned on, the flow advances to step (106) in which the "AE control" subroutine is executed. When this operation is completed, the flow advances to step (112) in which the "AF control" subroutine is executed.

Figure 14:
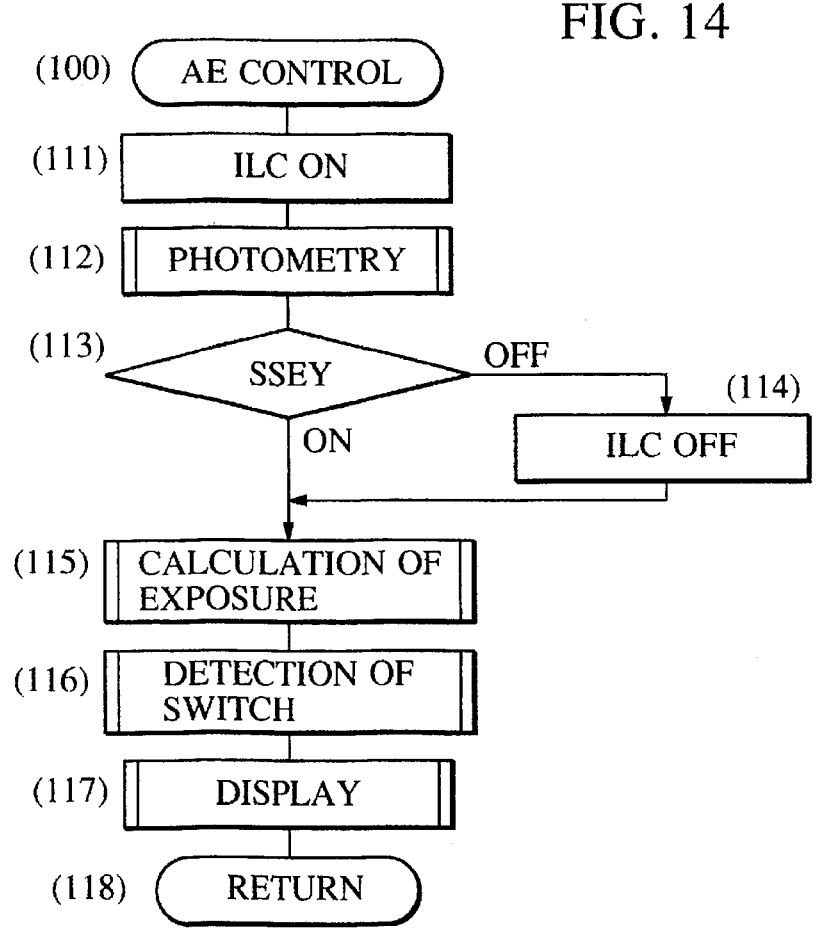
FIG. 14 is a flowchart illustrating an "AE control" subroutine in step (106) shown in FIG. 13.

FIG. 14 is a flowchart showing the "AE control" subroutine executed in the step (106) shown in FIG. 13.

In order to perform the photometric operation for controlling exposure, i.e., for leading light to the photometric sensor SPC placed on the eyepiece side, not the side of the liquid crystal finder display ILC, in step (111), an electric field is applied to the liquid crystal finder display ILC to create a complete transmission state or a display state similar thereto. The flow then advances to step (112) in which the photometric operation is performed. The eye contact state of the photographer is then decided in step (113), and the display states are switched in accordance with the decision result. Namely, if the eye contact detection signal SSEY is input, since the electric field of the liquid crystal finder display ILC has already been turned on, the flow advances to step (115). On the other hand, if the eye contact detection signal SSEY is not input, the flow advances to step (114) to turn off the electric field, and the flow then advances to step (115).

The exposure is calculated on the basis of the result of photometry in step (115), and the states of various switches are then detected in step (116). The displays are switched in the next step (117), and the "AE control" subroutine is completed in the next step (118).

Figure 15:
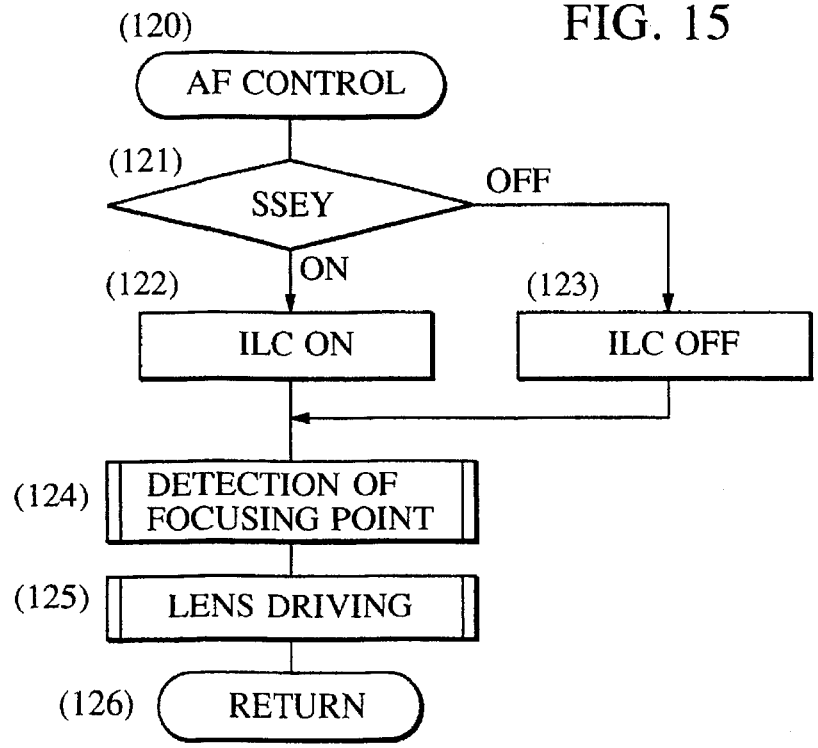
FIG. 15 is a flowchart illustrating an "AF control" subroutine in step (107) shown in FIG. 13.

FIG. 15 is a flowchart showing the "AF control" subroutine executed in the step (107) shown in FIG. 13.

The eye contact state of the photographer is decided in step (121), and the display states of the liquid crystal finder display ILC are switched in accordance with the decision result in steps (122) and (123).

The "focusing detection" subroutine is executed in the next step (124), and the "lens driving" subroutine is then executed in step (125). The "AF control" subroutine is completed in step (126).

When the non-transmission state is created in the state without application of a voltage, as in this embodiment, i.e., when a so-called negative liquid crystal finder display ILC is used, it is, of course, effective to switch the display state to the transmission state at the time the eye contact of the photographer is first detected. Further, when the display state is switched to various states (for example, the focusing detection area is set to the non-transmission state, and in the panorama photographic mode, the state shown in FIG. 8 is set) at the time turning on of the switch SW1 is detected, it is possible to inform the photographer that the camera is put into the operation state.

In the first embodiment, in a camera using a transmission type liquid crystal device as a finder display, the liquid crystal device is brought in the total non-transmission stage, for example, during execution of the AF operation (re-operation) before exposure in the photographic state wherein the photographer does not look through the finder, as in the remocon mode, interval photographic mode and self-timer mode. It is thus possible to minimize the back light entering from the finder, and always perform the accurate AF operation.

When the eye contact detector is also used, as in the second embodiment, the transmission state can be set only when required. In this case, when a so-called negative liquid crystal finder display in which the non-transmission state is set in the state without application of a voltage is used, the effectiveness of the detector is sufficiently exhibited.

Description will now be made of a case where the energy saving effect is positively utilized. As described above, when the eye contact detection signal is absent (not input), it is also effective to decrease the frequency of the applied voltage or the voltage other than cut off the applied voltage.

The energy saving effect may be achieved by not only the presence of the eye contact detection signal, but also the result of logical product of another signal and the eye contact detection signal. For example, when the normal transmission state is not set until both the eye contact detection signal and the turning on of the switch SW1 (the signal of start of the photographic preparatory operation) are detected, the energy saving effect can further be attained.

Although, in this embodiment, the PDLC type is used as the liquid crystal finder display ILC, the TN type shown in FIG. 4 and the GH type shown in FIG. 5 may be used. The present invention is not limited to a liquid crystal element, and any light modulation elements may be used.

Although, in the above embodiments, the present invention is applied a single-lens reflex camera, the present invention can also be applied to cameras such as a lens shutter camera, a video camera, etc., and applied as a component unit.

The present invention may comprise appropriate combination of the above embodiments or the techniques thereof.

The individual components shown in outline or designated by block in the Drawings are all well-known in the image recording arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention covers all modifications and equivalents included within the spirit and scope of the appended claims. The scope of the claims is to be accorded the broadest interpretation so as to encompass all such modifications, and equivalent structures.

What is claimed is:

1. An optical apparatus comprising:
    a projection optical system for projecting an image of an object;
    a detection system for detecting a defocus state the image of the object with respect to a photosensitive plane with light emitted from said projection optical system;
    a finder system for observing the object with the light emitted from said projection optical system, said finder system being provided with light modulation means for creating a light transmission state when electric energy is input and a cutoff state when the electric energy is not input, and said light modulation means being disposed so as to cover the entire view field of said finder system; and
    control means for controlling the input of electric energy to said light modulation means, said control means controlling the input so as not to input electric energy during a defocus state detection operation when a user does not look through said finder system.

2. An optical apparatus according to claim 1, wherein said optical apparatus is a camera.

3. An optical apparatus according to claim 2, wherein said control means comprises means for determining a photographic mode of said camera, and does not input electric energy to said light modulation means when the photographic mode of said camera is set to at least one of modes of remote control photography, interval photography and self-timer photography.

4. An optical apparatus according to claim 2, wherein said control means comprises means for deciding whether an eye of the user contacts said finder system, and does not input electric energy to said light modulation means when the user's eye does not contact said finder system.

5. An optical apparatus according to claim 4, wherein said control means causes an entirety of a plane of said light modulation means to effect the light transmission state when it is decided that an eye of a user contacts said finder system, and then puts a portion of said light modulation means into the cutoff state a switch for starting said optical apparatus to make photographic preparation operations is turned on.

6. An optical apparatus according to claim 2, wherein said light modulation means comprises a liquid crystal display panel.

7. An optical apparatus according to claim 6, wherein said liquid crystal display panel transmits light when electric energy is input thereto, and scatters light when electric energy is not input thereto.

8. An optical apparatus according to claim 2, wherein said light modulation means comprises a photometric device receiving a portion of a light emitted from said projection optical system through said light modulation means in the transmission state thereof, and said control means inputs electric energy to said light modulation means during photometry using said photometric device even if the user does not look through said finder system.

9. An optical apparatus according to claim 1, wherein said light modulation means comprises a liquid crystal display panel.

10. An optical apparatus according to claim 9, wherein said light crystal display panel transmits light when electric energy is input thereto, and scatters light when electric energy is not input thereto.

11. An optical apparatus comprising:
    a projection optical system for projecting an image of an object;
    a finder system for observing the object with a light emitted from said projection optical system, said finder system being provided with light modulation means for creating one of a light transmission state and a cutoff state in accordance with the presence or absence of input of electric energy, and said light modulation means being disposed so as to cover the entire view field of said finder system;
    means for deciding whether an eye of a user of said optical apparatus contacts said finder system;
    a switch for starting said optical apparatus making a photometric operation; and
    control means for bringing an entirety of a surface of said light modulation means into the transmission state when the eye of the user contacts said finder system and the switch is turned on, and then bringing a portion of said light modulation means into the cutoff state when the eye of the user remains in contact with said finder system and said switch is on.

12. An optical apparatus according to claim 11, further comprising a focal detection system for detecting a defocus state of the image of the object with respect to a photosensitive surface by a light emitted from said projection optical system.

13. An optical apparatus comprising:

a projection optical system for projecting an image of an object;

a finder system for observing the object with a light emitted from said projection optical system, said finder system being provided with light modulation means for creating one of a light transmission state and a cutoff state in accordance with the presence or absence of input of electric energy, and said light modulation means being disposed so as to cover the entire view field of said finder system; and control means for controlling input of the electric energy to said finder system so as to input first electric energy to said light modulation means when a command signal is supplied thereto, and input second electric energy with intensity lower than said first electric energy to said light modulation means when the command signal is not supplied thereto, the command signal being a signal indicating that the eye of a user is in contact with said finder system and a photographic preparation operation is being started.

14. An optical apparatus according to claim 13, wherein said light modulation means forms a transmission state when electric energy is input, and a cutoff state when electric energy is not input.

15. An optical apparatus according to claim 13, further comprising a focal detection system for detecting a defocus state of said object image with respect to a photosensitive surface by the light emitted from said projection optical system.

16. An optical apparatus comprising:

a projection optical system for projecting an image of an object;

a finder system for observing the object with a light emitted from said projection optical system, said finder system being provided with light modulation means for creating one of a light transmission state and a cutoff state in accordance with the presence or absence of input of electric energy, and said light modulation means being disposed so as to cover the entire view field of said finder system; and control means for controlling input of the electric energy to said finder system so as to input first electric energy to said light modulation means when a command signal is supplied thereto, and input second electric energy with a frequency lower than the first electric energy to said light modulation means when the command signal is not supplied thereto, the command signal being a signal indicating that the eye of a user is in contact with said finder system and a photographic preparation operation is being started.

17. An optical apparatus according to claim 16, wherein said light modulation means creates the transmission state when electric energy is input, and the cutoff state when electric energy is not input.

18. An optical apparatus according to claim 16, further comprising a focal detection system for detecting a defocus state of the image of the object with respect to a photosensitive surface by a light emitted from said projection optical system.

* * * * *

UNITED STATES PATENT AND TRADEMARK OFFICE
CERTIFICATE OF CORRECTION

PATENT NO. : 5,669,022
DATED : September 16, 1997
INVENTOR(S) : TERUTAKE KADOHARA, ET AL.

It is certified that error appears in the above-identified patent and that said Letters Patent is hereby corrected as shown below:

Sheet 5

Figure 5(a), "TRANSMITTET" should read --TRANSMITTED--.
    Figure 5(b), "TRANSMITTET" should read --TRANSMITTED--.

Sheet 6

Figure 6(b), "LIQULD" should read --LIQUID--.

Column 1

Line 19, "uses an" should read --uses a--.
    Line 39, "systems" should read --system--.
    Line 39, "sometime" should read --sometimes--.
    Line 40, "on" should read --on the --.

UNITED STATES PATENT AND TRADEMARK OFFICE
CERTIFICATE OF CORRECTION

PATENT NO. : 5,669,022    Page 2 of 3

DATED : September 16, 1997

INVENTOR(S) : TERUTAKE KADOHARA, ET AL.

It is certified that error appears in the above-identified patent and that said Letters Patent is hereby corrected as shown below:

Column 6

Line 9, "mirror" should read --a mirror--.

Column 7

Line 27, "d" should read --and--.
Line 30, "d" should read --and--.
Line 65, "Signals" (second occurrence) should read --signals--.

Column 8

Line 21, "$\phi\phi SH.$" should read --$\phi SH.$--

Column 10

Line 3, " the all" should read --all--.
Line 56, "decision" should read --a decision--.
Line 61, "stop" should read --step--.
Line 64, "=he" should read --the--.

UNITED STATES PATENT AND TRADEMARK OFFICE
CERTIFICATE OF CORRECTION

PATENT NO.    :   5,669,022
DATED         :   September 16, 1997
INVENTOR(S) :   TERUTAKE KADOHARA, ET AL.

It is certified that error appears in the above-identified patent and that said Letters Patent is hereby corrected as shown below:

<u>Column 11</u>

Line 52, "NO." should read --No.--.
    Line 59, "Decision" should read --A decision--.

<u>Column 12</u>

Line 11, "(112)" should read --(107)--.

<u>Column 13</u>

Line 25, "applied" should read --applied to--.

<u>Column 14</u>

Line 17, "state" should read --state when--.

Signed and Sealed this

Nineteenth Day of May, 1998

Attest:

BRUCE LEHMAN

*Attesting Officer*       *Commissioner of Patents and Trademarks*